(12) United States Patent
Detzner

(10) Patent No.: US 6,274,211 B1
(45) Date of Patent: Aug. 14, 2001

(54) KINETIC ENERGY ABSORBING ELEMENT

(75) Inventor: Friedhelm Detzner, Duisburg (DE)

(73) Assignee: Ringfeder VGB GmbH, Krefeld (DE)

( * ) Notice: Subject to any disclaimer, the term of this patent is extended or adjusted under 35 U.S.C. 154(b) by 0 days.

(21) Appl. No.: 09/367,990

(22) PCT Filed: Feb. 11, 1998

(86) PCT No.: PCT/DE98/00394

§ 371 Date: Aug. 20, 1999

§ 102(e) Date: Aug. 20, 1999

(87) PCT Pub. No.: WO98/38438

PCT Pub. Date: Sep. 3, 1998

(30) Foreign Application Priority Data

Feb. 25, 1997 (DE) ............................. 197 07 434

(51) Int. Cl.⁷ .................. F16F 1/373; F16F 3/087; F16F 1/44; F16F 1/40
(52) U.S. Cl. .............. 428/36.9; 428/34.1; 188/371; 188/377; 267/136; 267/292; 267/293; 267/294
(58) Field of Search ................. 428/34.1, 35.1, 428/36.9, 36.91; 188/371, 377; 267/136, 137, 195, 292, 293, 294

(56) References Cited

U.S. PATENT DOCUMENTS 3,784,181 * 1/1974 Nemed ..................... 267/140
5,161,655 * 11/1992 Shimoda ................. 188/371
5,529,327 * 6/1996 Huang ..................... 280/276

FOREIGN PATENT DOCUMENTS 19 12 049    10/1970  (DE).
29 49 677 A1  6/1981  (DE).
2 152 181 A  * 7/1985  (GB).

* cited by examiner

Primary Examiner—Blaine Copenheaver
Assistant Examiner—Alicia Chevalier
(74) Attorney, Agent, or Firm—Michael J. Striker

(57) ABSTRACT

The deformable element for absorbing kinetic energy is a plastic pipe section (1) having interior surfaces at opposite ends thereof. The plastic pipe section (1) initially deforms elastically under an applied axial force (F) and, when a yield stress limit is exceeded by the applied axial force (F), the plastic pipe section (1) deforms or collapses with an approximately equal deforming force over a work stroke until adopting a physically deformed shape in which the interior surfaces at the opposite ends contact each other. The device for absorbing kinetic energy is also described including several plastic pipe sections stacked in a column with an intermediate plate between each adjacent pair of pipe sections. The plastic pipe sections and engaged around a tubular round body for support and guidance. An inner screw bolt can also be provided for pre-tensioning the plastic pipe sections.

2 Claims, 4 Drawing Sheets

KINETIC ENERGY ABSORBING ELEMENT

BACKGROUND OF THE INVENTION

1. Field of the Invention

The invention is directed to an element for absorbing kinetic energy which works mechanically based on the principle of plastic deformation.

2. Prior Art

DE-OS 19 21 049 discloses a mechanically acting absorbing element which is formed of at least two telescoping hollow cylinders with overlapping diameters. The absorption of energy is achieved in that the hollow cylinders are plastically deformed outwardly and inwardly when pushed together. DE-OS 29 49 677 shows a possibility for application of an element of this kind as a shock dissipating element inside a central buffer coupling of a railborne vehicle. In the known absorbing element, in particular, the large length of structural component parts and the considerable manufacturing cost (exacting dimensional tolerances) are considered disadvantageous. Another disadvantage is the large weight of the known element resulting from the required use of steel for the hollow bodies for purposes of a usable working capacity.

Further, energy-converting systems which are used primarily in the bumper area of vehicles in order to prevent damage to the vehicle up to predetermined collision speeds of, e.g., 8 km/h are also known from the prior art. Systems of this kind contain reversible hydraulic dampers which are technically complicated with respect to manufacturing and servicing and are accordingly relatively expensive and have considerable weight, or plastically deformable, i.e., non-reversible, bodies, e.g., aluminum honeycomb, which are predictably very heavy in general.

SUMMARY OF THE INVENTION

It is the object of the invention to provide a light, predictable and easily handled element which can be manufactured economically for absorbing kinetic energy in a particularly small space and which maintains a constant working behavior throughout its period of use.

This object is attained according to the invention by an element for absorbing kinetic energy operating mechanically according to the principle of plastic deformation, which consists of a plastic pipe section having interior surfaces at opposite ends thereof and which initially deforms elastically under an applied axial force. When a yield stress limit of the plastic pipe section is exceeded by the applied axial force, the plastic pipe section deforms or collapses with an approximately equal deforming force over a work stroke until adopting a physically deformed shape in which the interior surfaces at the opposite ends of the plastic pipe section contact each other.

Advantageous developments of the invention are indicated in the subclaims.

The absorbing element according to the invention can basically be used wherever extensive damage to valuable objects must be prevented in the event of rarely occurring overload. The absorbing element is suitable, for example, as an energy dissipator behind a vehicle coupling or behind a vehicle bumper.

The absorbing element according to the invention can be adapted in a simple manner to the requirements of the application in question through the variability of its structural component geometry: the height of the block-shaped section of the thick-walled plastic pipe is decisive for the length of the spring path, the radial expansion when acted upon by force and force break-in when the outer contour of the block-shaped section is inclined by 45° during upsetting. As thickness increases, the wall of the block-shaped section reduces the available spring deflection or spring path and increases the rise in force beyond the state of yield stress. Finally, the cross section of the thick-walled section is decisive for the height of the elastic rise in force.

The initial elasticity of the absorbing element results on the one hand in a favorable protection against deformation during small impacts in many types of application; on the other hand, it provides the possibility for clamping or bracing the block-shaped section with other structural component parts, so that minor contact impacts will not cause longitudinal play. After a work stroke in excess of the yield stress, there is a plastic deformation of the block-shaped section, which should then be replaced because, depending on the degree of deformation, the maximum possible energy absorption will no longer be available. Static and dynamic characteristic lines are approximately identical; only the fullness of the curve increases dynamically. No elaborate dynamic tests are required for checking previously calculated characteristics.

BRIEF DESCRIPTION FO THE DRAWING

The objects, features and advantages of the invention will now be illustrated in more detail with the aid of the following description of the preferred embodiments, with reference to the accompanying figures in which.

DESCRIPTION OF THE PREFERRED EMBODIMENTS

Figure 1A:
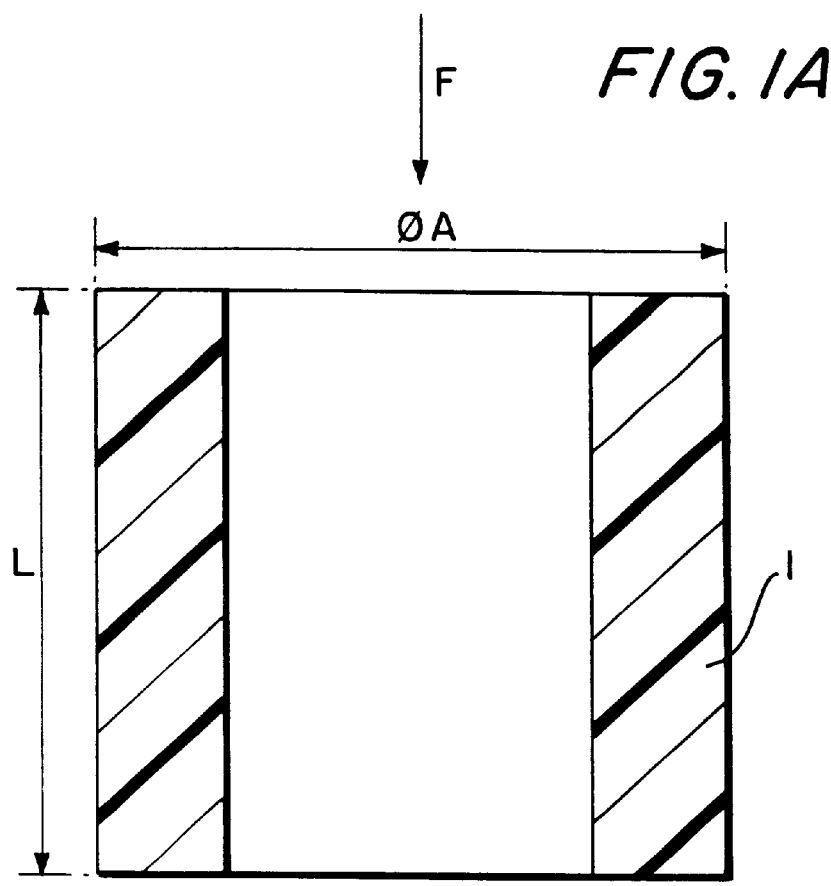
FIG. 1A is a cross sectional view through an element according to the invention for absorbing kinetic energy in the new state.

According to FIG. 1A, the absorbing element is formed of a block-shaped portion 1 of a thick-walled plastic pipe, wherein this section 1 has length L and outer diameter A. Plastics with sufficient toughness-the absorbing element should not shatter when loaded-and a freezing point above conventional application temperatures are suitable for the block-shaped section 1.

Figure 1B:
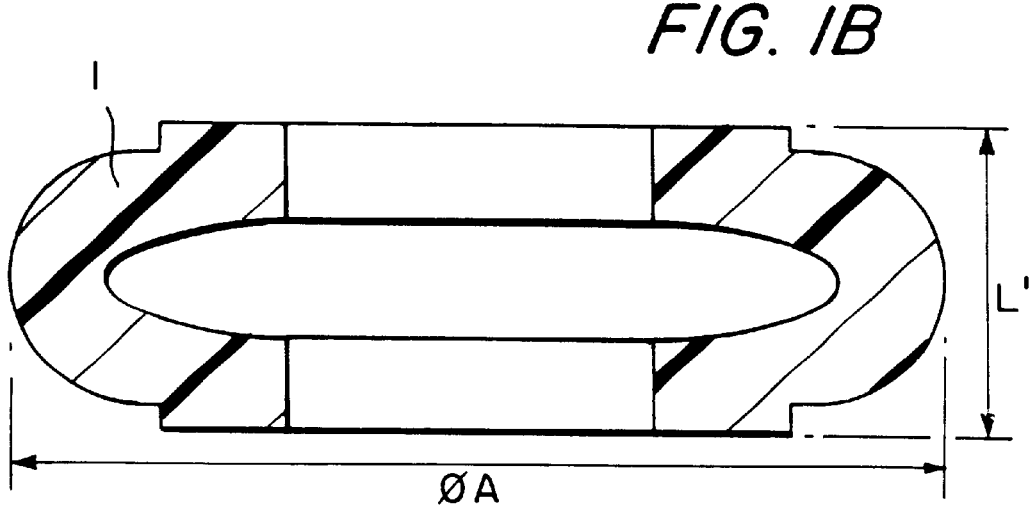
FIG. 1B is a cross sectional view through the element according to FIG. 1A after plastic deformation.
Figure 2:
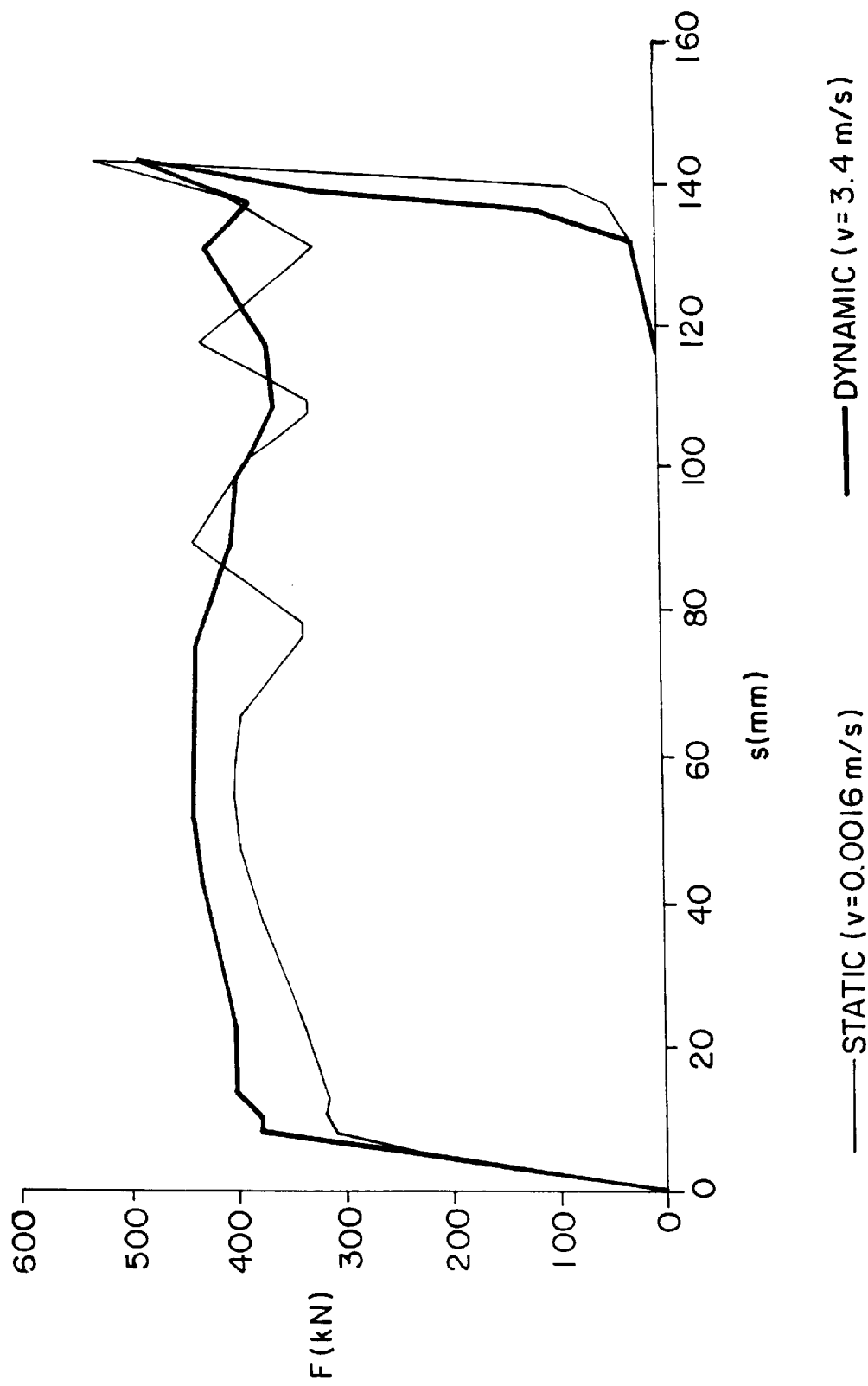
FIG. 2 is a graphical illustration of a typical load-displacement curve of a column formed of three elements according to FIGS. 1A and 1B.

As is shown in the graph in FIG. 2, the block-shaped section 1 has an initial elasticity. When loaded beyond the yield stress, the block-shaped section 1 deforms until it adopts the plastically deformed shape (full work stroke) shown in FIG. 1B with a reduced length L' and an outer diameter A' which is enlarged in a bulging manner. At the end of the full work stroke, the surfaces extending transverse to the direction of force F within the bulge contact one another (see force peak in the graph in FIG. 2); the toroidal free space inside the block-shaped section 1 occurs after the absorption of the load by elastic spring-back as can also be seen from the graph.

Figure 3:
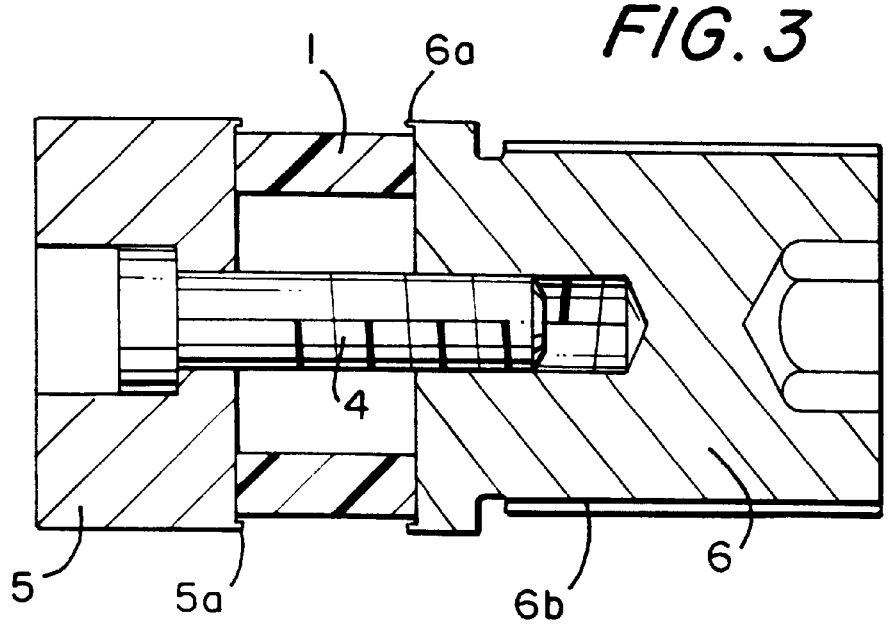
FIG. 3 is a cross-sectional view through the element according to FIG. 1A inside a shock dissipator unit ready to be mounted.

In the arrangement according to FIG. 3, the absorbing element formed of an individual block-shaped section 1 is held via an inner screw bolt 4 between a pressure piece 5 and a connection piece 6 and can be pretensioned depending on the conditions of application. The connection piece 6 can be screwed into a component assembly which is to be protected from overload, e.g., a machine tool, via an external thread 6*b* which is selected in the embodiment example. The impact force to be dissipated is introduced via the pressure piece or thrust piece 5. The thrust piece 5 and the connection piece 6 can be connected with a collar 5*a* and 6*a*, respectively, as a guide for the block-shaped section 1.

Figure 4:
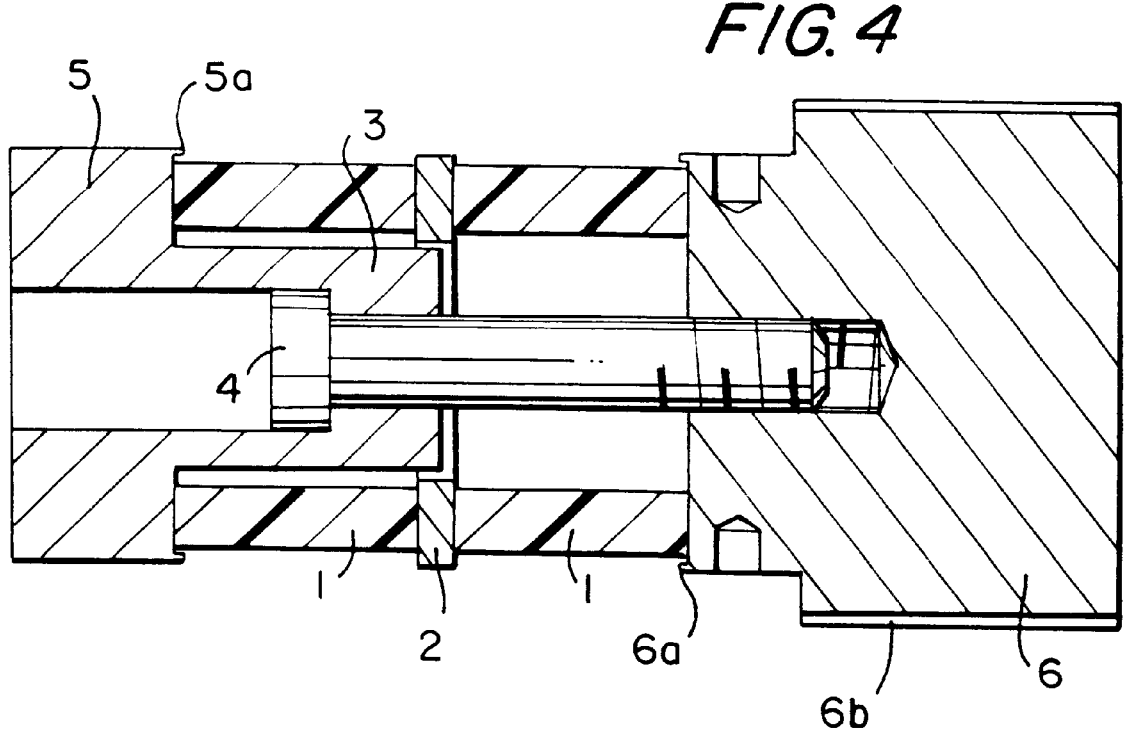
FIG. 4 is a cross-sectional view through an arrangement similar to FIG. 3, but with two elements according to FIG. 1A.

According to FIG. 4, two of the block-shaped sections 1 form a column with a plate 2 arranged therebetween, wherein a glue connection between the sections 1 and the plate 2 is advisable. The thrust piece 5 has a round body 3 which engages in the column and which cooperates with the plate 2 for purposes of inner guidance. The column is held and, as the case may be, also pretensioned between the thrust piece 5 and the connection piece 6 by means of an inner screw bolt 4.

Figure 5:
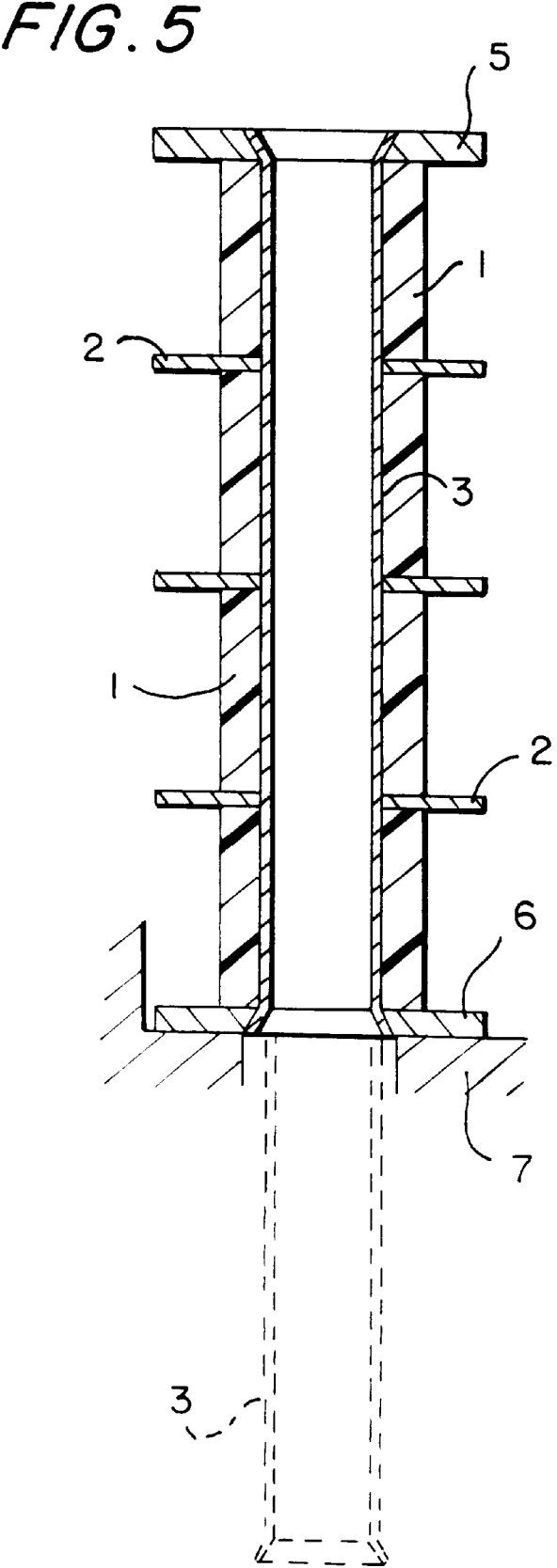
FIG. 5 is a cross-sectional view through a column formed of five elements according to FIG. 1A inside another arrangement.

FIG. 5 shows the possibility of guiding a column formed of four block-shaped sections 1 with a corresponding number of intermediate plates 2 by means of a tubular round body 3. The column is held together and, as the case may be, also pretensioned by the positive engagement of the tubular round body 3 shown in the drawing (in this case, by flanging) with the thrust piece 5 and the connection piece 6. It will be appreciated that there must be space available behind the connection piece 6 connected with the component assembly 7 to be secured, as is shown in dashed lines, for the penetration of the round body 3.

Further, FIG. 5 shows the possibility of guiding the column at structural component parts, not shown, located outside of the column by means of the plates 2 having correspondingly large dimensions. The round body 3 can be omitted in this case. External guidance of this kind can also be realized in the embodiment example according to FIG. 4.

What is claimed is:

1. A device for absorbing kinetic energy operating mechanically according to the principle of plastic deformation, said device consisting of
   - a plurality of plastic pipe sections (1) arranged in a column;
   - a round body (3) engaged in the column for holding and guiding said plastic pipe sections (1); and
   - an intermediate plate (2) arranged between each adjacent pair of said plastic pipe sections;
   - wherein each of said plastic pipe sections (1) has interior surfaces at opposite ends thereof and initially deforms elastically under an applied axial force (F) and, when a yield stress limit of each of said plastic pipe sections (1) is exceeded by said applied axial force (F), each of said plastic pipe sections (1) deforms or collapses with an approximately equal deforming force over a work stroke until adopting a physically deformed shape in which said interior surfaces at said opposite ends contact each other.

2. A device for absorbing kinetic energy operating mechanically according to the principle of plastic deformation, said device consisting of
   - a plurality of plastic pipe sections (1) arranged in a column;
   - a round body (3) engaged in the column for holding and guiding said plastic pipe sections (1);
   - an inner screw bolt (4) for pre-tensioning the plastic pipe sections (1); and
   - an intermediate plate (2) arranged between each adjacent pair of said plastic pipe sections;
   - wherein each of said plastic pipe sections (1) has interior surfaces at opposite ends thereof and initially deforms elastically under an applied axial force (F) and, when a yield stress limit of each of said plastic pipe sections (1) is exceeded by said applied axial force (F), each of said plastic pipe sections (1) deforms or collapses with an approximately equal deforming force over a work stroke until adopting a physically deformed shape in which said interior surfaces at said opposite ends contact each other.

* * * * *